US012679443B2

(12) United States Patent
Cho

(10) Patent No.: US 12,679,443 B2
(45) Date of Patent: Jul. 14, 2026

(54) STEER DRIVE WHEEL MECHANISM

(71) Applicant: RINUC Inc., Seoul (KR)

(72) Inventor: Whang Cho, Bucheon-si (KR)

(73) Assignee: RINUC Inc., Seoul (KR)

( * ) Notice: Subject to any disclaimer, the term of this patent is extended or adjusted under 35 U.S.C. 154(b) by 354 days.

(21) Appl. No.: 18/428,419

(22) Filed: Jan. 31, 2024

(65) Prior Publication Data

US 2024/0278640 A1    Aug. 22, 2024

(30) Foreign Application Priority Data

Feb. 20, 2023    (KR) ........................ 10-2023-0022746

(51) Int. Cl.
B62D 5/04        (2006.01)
B62D 7/02        (2006.01)
(52) U.S. Cl.
CPC ............. B62D 5/0418 (2013.01); B62D 7/02 (2013.01)
(58) Field of Classification Search
CPC .......................... B62D 7/02; B60K 2007/0038
See application file for complete search history.

(56) References Cited

U.S. PATENT DOCUMENTS 7,617,890 B2 * 11/2009 Romig ................... B62D 7/023
                                                              56/6
2018/0022390 A1 * 1/2018 Cai ...................... B60K 17/165
                                                              180/252

FOREIGN PATENT DOCUMENTS

EP              3501872 A1 *  6/2019 ........... B62D 5/0418
JP         2010-023809 A      2/2010
JP         2020-019361 A      2/2020
KR     10-1999-0087181 A     12/1999
KR     10-2001-0077779 A      8/2001
KR         100656855 B1 * 12/2006 ........... B62D 11/105
WO     WO-2007036314 A1 *  4/2007 ........... B60K 7/0007

* cited by examiner

*Primary Examiner* — Kevin Hurley

(57)        ABSTRACT
The disclosed invention introduces a steer-drive wheel mechanism, suitable for applications like mobile platforms, featuring two motors mounted on the platform. This design enables an unrestricted steering angle for the wheel without encountering challenges in delivering power and control signals to the motors. The two motors collaborate through two coaxially arranged axes in driving and steering the wheel, ensuring optimal power utilization and minimizing unnecessary mechanical stresses. Continuous cooperation of the two motors in driving and steering the wheel can be achieved using a 'motion synthesizer.' This device accepts two rotational motions from the motors and, depending on the required operation of the wheel mechanism, produces appropriate rotational motions for driving and steering the wheel.

16 Claims, 15 Drawing Sheets

STEER DRIVE WHEEL MECHANISM

CROSS-REFERENCE TO RELATED APPLICATION

This application claims the benefit of the Korean Patent Application No. 10-2023-0022746, filed on Feb. 20, 2023, which is hereby incorporated by reference as if fully set forth herein.

BACKGROUND

Field of the Invention

The current invention pertains to steer-drive wheel systems, specifically focusing on powered wheel mechanisms utilized in the development of drive systems for mobile platforms. These platforms include wheeled mobile robots, autonomous mobile robots (AMRs), automated guided vehicles (AGVs), motorized wheelchairs, forklifts, and various other wheeled mobility devices.

Discussion of the Related Art

Various configurations of mobile platforms have been developed, typically featuring a base or platform, drive systems, controllers, sensors, manipulators, and necessary equipment for the platform's intended operations. These platforms can be driven by wheels, tracks, "legs," or other means. Maneuverability is a crucial aspect of mobile platforms, allowing them to navigate obstacles and perform tasks effectively. Increased maneuverability is associated with the ability to generate more independent degrees of freedom. For a mobile platform moving on a ground plane, this translates to a maximum of three degrees of freedom-two translational and one rotational. Full control over these degrees of freedom results in an omnidirectional system, while instantaneous control over their acceleration defines a holonomic system.

To achieve omnidirectional mobility, one or more steer drive wheels can be employed, pivoting about a vertical steer axis and rotating around a horizontal drive axis. The vertical steer axis may or may not intersect with the horizontal drive axis. When they do not intersect, an offset distance creates a caster wheel, enabling the platform to accelerate in any direction and making it holonomic.

Prior art in steer drive wheel mechanisms often involves two motors-one for steering and another for driving the wheel. Three common configurations exist for the installation of these motors. In the first, both steering and driving motors are installed on the wheel bracket, requiring electrical power and signals to be transferred from the platform through a slip ring to steer the wheel freely. The second configuration has only the driving motor on the wheel bracket, with the steering motor on the platform, necessitating a slip ring for free steering. The third configuration places both motors on the platform, transmitting driving power to the wheel through various mechanical drive train configurations, eliminating the need for a slip ring, a primary advantage of this setup.

However, the prior art of installing both motors on the platform has drawbacks arising from the mechanical structure using a single power train to transfer driving power from the motor to the wheel. In this setup, the torque generated by the driving motor is transmitted not only to the wheel but also to the wheel bracket, causing unintended steering for the wheel. This phenomenon is inevitable if a single drive train is used to transfer driving power from the motor to the wheel, and the torque generated initially travels parallel to the steer axis before being redirected to align with the drive axis, perpendicular to the steer axis.

Therefore, in conventional systems, maintaining the desired azimuth (or orientation) of the wheel without applying an additional counteracting torque is not achievable. This inevitably leads to unintended torque being imposed on the wheel frame along the steer axis, presenting challenges that require resolution.

Overcoming the unintended torque to maintain the desired azimuth and delivering steering torque when a change of azimuth is required necessitates the use of a dedicated azimuth (or steering) control system. Consequently, to maintain or alter the wheel's azimuth conventional technologies expend a significant amount of energy compensating for the counteracting torque equal to that delivered vertically along the steer axis by the driving motor.

Components of the steering control system experience continuous exposure to internal time-varying mechanical stresses, accumulating throughout wheel operation. For instance, common steering system components like the ring and pinion gear are in constant contact without relative rotation, leading to accelerated wear and fatigue due to stress concentration. Although the resisting torque and internal stress can be distributed by incorporating multiple steering motors, conventional systems face challenges in enhancing the dynamic steering agility of the wheel. This limitation stems from the typically restricted power available for the dedicated steering control system.

The practical use of a high torque/low-speed motor to drive the wheel is not feasible, as a high torque driving motor would intensify the burden on the steering motor in the steering control system, resulting in increased energy waste and mechanical stress.

SUMMARY

The invention provides a method to construct a steer-drive wheel mechanism, where two electric motors, fixedly installed relative to a mobile platform, collaboratively drive and steer the wheel through coaxially arranged axes. This cooperative operation ensures efficient power utilization and minimizes unnecessary mechanical stresses. The continuous collaboration of the two motors in driving and steering the wheel can be achieved by using a 'motion synthesizer,' which combines two rotational motions from the motors to appropriately produce motions for driving and steering the wheel.

In accordance with the present invention, when the two rotational motions applied to the steerable wheel bracket by the motors are equal in magnitude but opposite in direction along the steer axis, the wheel can undergo a driving motion (rolling) without steering. Conversely, when the two rotational motions are equal in magnitude and direction along the steer axis, the wheel can experience steering motion without driving. Simultaneous generation of driving and steering motion is possible by controlling the magnitude and direction of the two rotational motions.

Furthermore, the present invention allows the configuration of a steer-drive wheel mechanism with either one or two driving wheels. A two wheeled steer-drive mechanism can be achieved by feeding the rotational motion produced by the "motion synthesizer" into a differential gear mechanism. This not only enables the steer-drive wheel to handle a larger payload but also facilitates steering the wheel with approximately 50% less steering torque compared to a single wheeled steer-drive mechanism.

DETAILED DESCRIPTION

Figure 1:
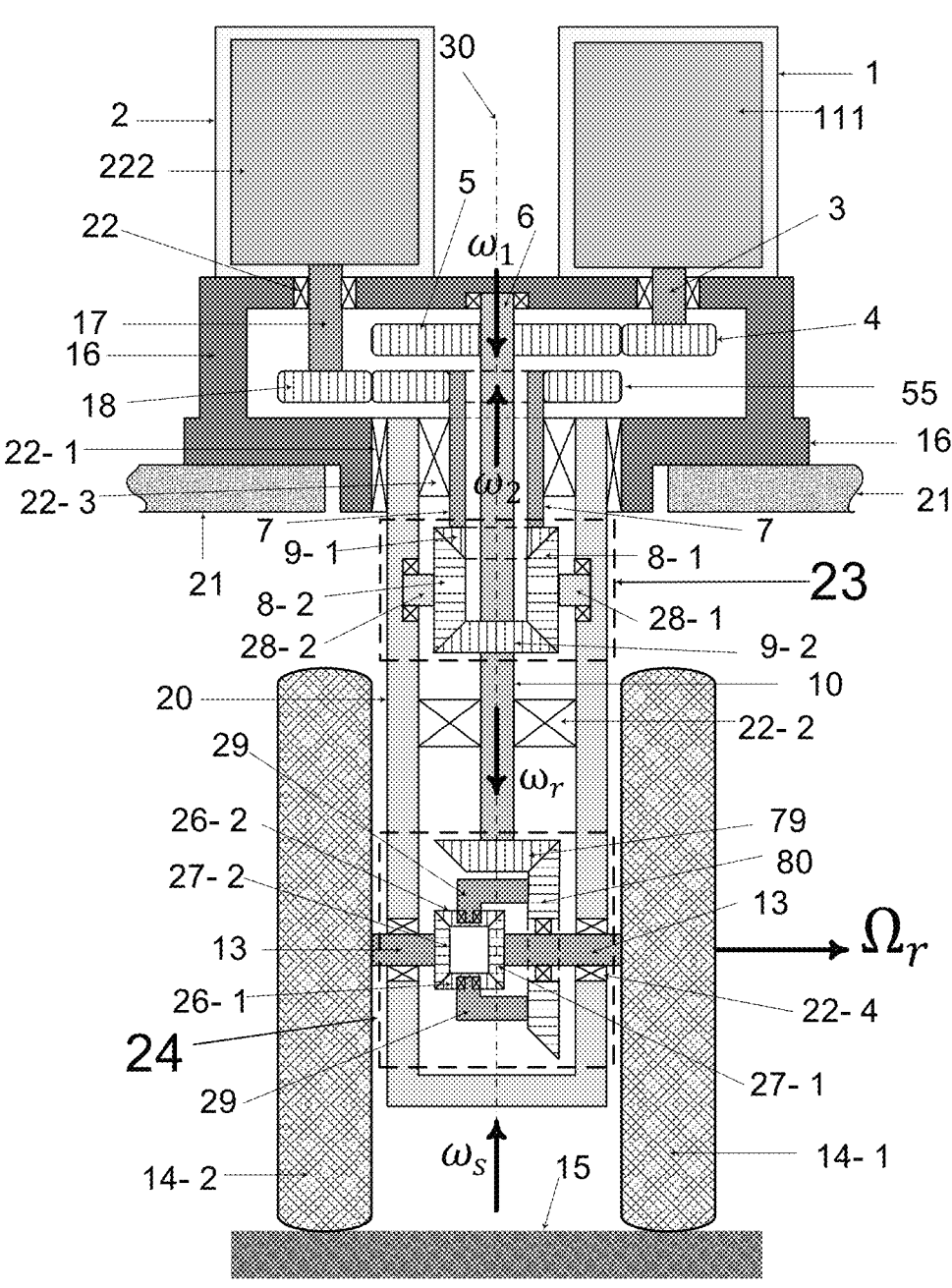
FIG. 1 illustrates a conceptual embodiment of the invention, where two stationary motors 1 and 2 collaborate to transmit power to the wheels.

Hereinafter, specific embodiments of the present invention will be described with reference to the drawings. The detailed descriptions that follow are provided to facilitate a comprehensive understanding of the methods, devices and/ or systems described herein. However, this is only an example, and the present invention is not limited thereto.

In describing the embodiments of the present invention, if it is determined that the detailed description of the known technology related to the present invention may unnecessarily obscure the subject matter of the present invention, the detailed description will be omitted. In addition, terms to be described later are terms defined in consideration of functions in the present invention, which may vary according to the intention or custom of a user or operator. Therefore, the definition should be made based on the contents throughout this specification. The terminology used in the detailed description is only for describing the embodiments of the present invention and should in no way be limiting. Unless expressly used otherwise, singular forms of expression include plural forms. In this description, expressions such as "comprising" or "comprising of" are intended to indicate certain characteristics, numbers, steps, operations, elements, some, or combinations thereof, and one or more other than those described. It should not be construed to exclude the existence or possibility of any other feature, number, step, operation, element, part, or combination thereof.

In one embodiment of the present disclosure, the reference numerals of the components to be described below are assigned random numbers or letters for convenience of description, and the corresponding reference numerals do not mean higher or lower concepts between the components.

Figure 2:
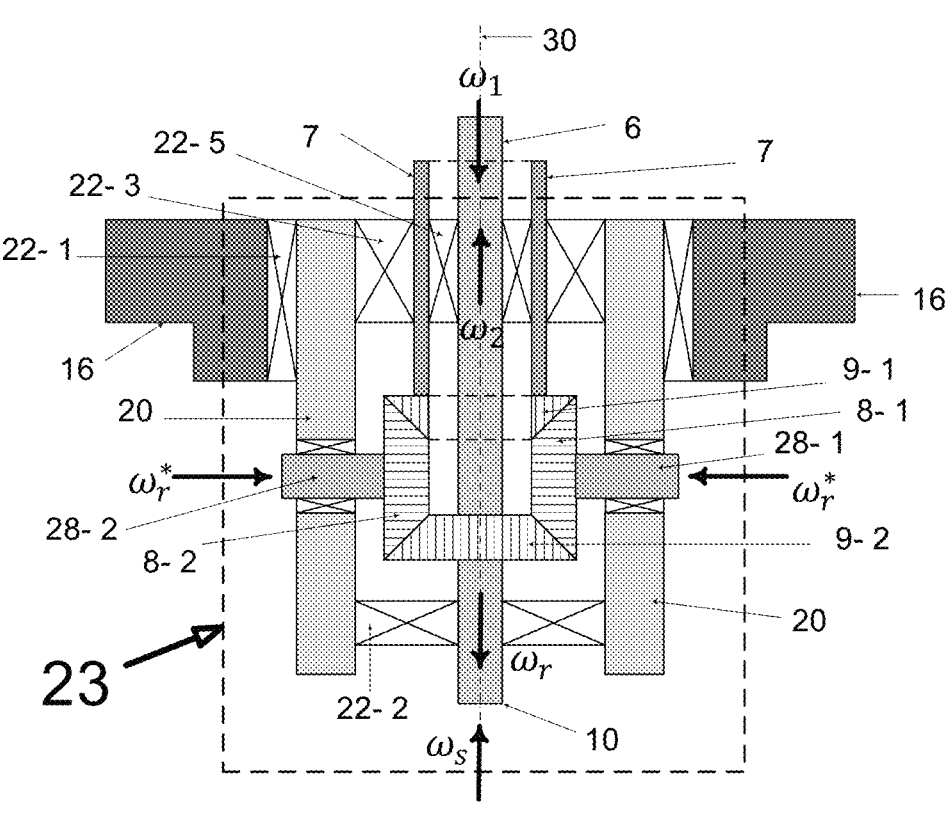
FIG. 2 shows the 'motion synthesizer' which two input motions to generate two output motions.

FIG. 1 illustrates a conceptual embodiment of the invention, where two stationary motors 1 and 2 collaborate to transmit power to the wheel 14-1 and 14-2. FIG. 2 shows the 'motion synthesizer' which two input motions to generate two output motions. This design features a coaxial configuration of two axes, propelling both the motion synthesizer 23 and subsequently the differential 24.

The wheel bracket 20 is rotatably mounted on the fixed frame 16, which is attached to a mobile platform. The fixed frame 16 remains stationary relative to the mobile platform. The wheel bracket 20 rotates relatively freely with the fixed frame 16 by the first motor 1 and the second motor 2 mounted on the wheel bracket 16. That is, the first motor 1 and the second motor 2 rigidly installed on the fixed frame 16 to collaborate in driving and steering the wheel.

The wheel bracket 20 is rotatably mounted on the fixed frame 16 such that it can be steered about steer axis 30 relative to the fixed frame 16. The inner input shaft 6 and the outer input shaft (hollow shaft) 7 of the concentric biaxial structure are fastened to the same rotation axis as the wheel bracket 20 and rotate relative to the fixed frame 16. The inner input shaft 6 and an outer input shaft 7 configured coaxially along steer axis 30 to transmit two rotational motions generated by the first and the second motors, respectively.

The steer drive wheel mechanism comprises a first gear unit configured to transfer rotational motion of the first motor 1 to the inner input shaft 6, and a second gear unit configured to transfer rotational motion of the second motor 2 to the outer input shaft 7. Wherein the first motor 1 and the second motor 2 are configured, based on the inner input shaft 6 and the outer input shaft 7 generating rotational motion in the same magnitude and direction to each other, to rotate the wheel bracket 20 relative to the fixed frame 16 about steer axis 30 without causing rotational motion of the wheel 4 about wheel axis 13 relative to the wheel bracket 20. Wherein the first motor 1 and the second motor 2 are configured, based on the inner input shaft 6 and the outer input shaft 7 generating rotational motion in the same magnitude but opposite direction to each other, to rotate the wheel 14 about the wheel axis 13 relative to the wheel bracket 20 without causing rotational motion of the wheel bracket about the steer axis 30 relative to the fixed frame 16.

The rotational movement of the wheel bracket 20 means that the wheel bracket 20 rotates relative to the fixed frame 16 around the steering axis 30 through the steering bearing 22-1. In this arrangement, motor 1 sequentially drives gear 4, gear 5, inner input shaft 6, and horizontal bevel gear 9-2 within the motion synthesizer 23. The gear 5 and the inner input shaft 6 rotate around the steering axis 30. Similarly, motor 2 sequentially turns gear 18, gear 55, outer input shaft 7, and horizontal bevel gear 9-1. The gear 55 and the outer input shaft 7 rotate around the steering axis 30. In all figures, crossed rectangles represent bearings facilitating relative rotation.

Rotational motions of horizontal bevel gears 9-1 and 9-2 are combined inside the motion synthesizer 23 by the two vertical bevel gears 8-1 and 8-2 attached to horizontal output shaft 28-1 and 28-2, respectively. This combination produces rotational motion of vertical output shaft 10 relative to the wheel bracket 20 and rotational motion of the wheel bracket 20 relative to the fixed frame 16. Both rotational motions occur about steer axis 30. It is very crucial to note that although two vertical bevel gears 8-1 and 8-2 are illustrated in FIG. 1, the minimum number of vertical bevel gear required for the motion synthesizer 23 is one but three or more vertical bevel gears may be used to facilitate rotational motion of the wheel bracket 20 relative to the fixed frame 16.

Referring to FIG. 1, in the motion synthesizer 23, the wheel bracket 20 includes at least one horizontal output shaft 28-1 and 28-2 and at least one vertical bevel gear 8-1 and 8-2 provided at the end of the horizontal output shaft 28-1 and 28-2. At the bottom, the first horizontal bevel gear 9-2 provided at the bottom of the inner input shaft 6 may be meshed with the vertical bevel gears 8-1 and 8-2. The first horizontal bevel gear 9-2 coupled to the inner input shaft 6 and configured to be rotated about the steer axis 30 by the inner input shaft 6. Similarly, At the top, the second horizontal bevel gear 9-1 provided at the bottom of the outer input shaft 7 may be meshed with the vertical bevel gears 8-1 and 8-2. The second horizontal bevel gear 9-1 coupled to the outer input shaft 7 and configured to be rotated about the steer axis by the outer input shaft 7. At least one vertical bevel gear 8-1 and 8-2 is engaged with both the first horizontal bevel gears 9-2 and the second horizontal bevel gears 9-1 and coupled to the horizontal output shaft 28-1 and 28-2.

That is, the motion synthesizer 23 accepts two rotational motions from the inner outer input shaft 6 and the outer input shaft 7 and produces rolling (or driving) motion of the wheel 14 relative the wheel bracket 20 and steering motion of the wheel bracket 20 relative to the fixed frame 16. The vertical output shaft 10 extended from inner input shaft 6 and at least one horizontal output shaft 28-1 and 28-2. The gear unit is disposed within the motion synthesizer 23, the gear unit coupled to the inner input shaft 6, the outer input shaft 7, at least one the horizontal output shaft 28-1 and 28-2.

In FIG. 1, $\omega_1$ and $\omega_2$ denote angular velocities, relative to the fixed frame 16, of the two coaxially arranged shafts: the inner input shaft 6 and the outer input shaft 7, respectively. Additionally, $\omega_r$ and $\omega_s$ denote the angular speed of the vertical output shaft 10 relative to the wheel bracket 20 and steering angular speed of the wheel bracket 20 relative to the fixed frame 16, respectively.

The rolling (or driving) angular speed of the wheel $\Omega_r$ is defined by the average of the angular velocities of two wheels 14-1 and 14-2 relative to the wheel bracket 20. $\Omega_r$ is a constant multiple of $\omega_r$, where the constant is determined by the gear ratio between bevel gears 79 and 80. The arrows associated with angular velocities indicate the direction of rotation according to the right-hand rule. Notice that the directions of $\omega_1$ and $\omega_2$ are defined as opposite to each other for convenience.

FIG. 2 shows exclusively the motion synthesizer 23, wherein vertical bevel gears 8-1 and 8-2 coupled to the horizontal output shaft 28-1 and 28-2, respectively, engage with both horizontal bevel gears 9-1 and 9-2. Denoting the angular speed of the horizontal output shafts 28-1 and 28-2 by $$\omega_r^*,$$

the role of the motion synthesizer 23 can be expressed in kinematic relationship involving $\omega_1$, $\omega_2$, $\omega_r$, $$\omega_r^*$$

and $\omega_s$ as follows:

$$\omega_r = \frac{1}{2} \cdot \omega_1 + \frac{1}{2} \cdot \omega_2 \tag{1-1}$$

$$\omega_s = -\frac{1}{2} \cdot \omega_1 + \frac{1}{2} \cdot \omega_2 \tag{1-2}$$

$$\omega_r^* = \frac{1}{2a} \cdot \omega_1 + \frac{1}{2a} \cdot \omega_2 \tag{1-3}$$

where a is a constant determined by the gear ratio between bevel gears 9-1 and 8-1. Here $\omega_1$ and $\omega_2$ may be considered as inputs to the motion synthesizer 23, while $\omega_r$, $\omega_s$, and $$\omega_r^*$$

serve as outputs of the motion synthesizer 23. It is worth noting that $$\omega_r^*$$

can also be used to drive wheel(s) as will be shown in alternative embodiments. The inverse kinematic relationship among $\omega_1$, $\omega_2$, $\omega_r$, and $\omega_s$ can also be obtained as $$\omega_1 = \omega_r - \omega_s \tag{2-1}$$

$$\omega_2 = \omega_r + \omega_s \tag{2-2}$$

and the inverse kinematic relationship among $\omega_1$, $\omega_2$, $$\omega_r^*,$$

and $\omega_s$ can also be obtained as $$\omega_1 = a \cdot \omega_r^* - \omega_s \tag{3-1}$$

$$\omega_2 = a \cdot \omega_r^* + \omega_s \tag{3-2}$$

Equations (1-1), (1-2), and (1-3) imply that when $\omega_1$ and $\omega_2$ possess equal magnitudes but opposite directions, as indicated by arrows, only wheel's rolling motion occurs because $\omega_s$ is equal to zero, i.e., no steering motion. And when $\omega_1$ and $\omega_2$ have equal magnitudes and the same directions, only steering motion of the wheel takes place, as $\omega_r$ and $$\omega_r^*$$

are both zero, i.e., no rolling motion. These two operational conditions guarantee that the collaboration between two motors in driving and steering the wheel is really feasible through the present invention. Meanwhile, in a general scenario where both $\omega_r$ and $\omega_s$ need to be nonzero to simultaneously drive and steer the wheel, the corresponding $\omega_1$ and $\omega_2$ can be determined from Eqns. (2-1) and (2-2), and when both $$\omega_r^*$$

and $\omega_s$ are required to be nonzero for simultaneous driving and steering, corresponding $\omega_1$ and $\omega_2$ can be obtained from Eqns. (3-1) and (3-2).

In addition, at least one wheel 14-1 and 14-2 is rotatably mounted on the wheel bracket 30 through a wheel axis 13. Specially, the wheel bracket 20 includes at least one wheel 14-1 and 14-2 fixed to at least one wheel axis 13 that can rotate relative to the wheel bracket 20. The rolling motion of the wheel 14-1 and 14-2 means the rotating motion of the wheel 14-1 and 14-22 fixed to the wheel axis 13 relative to the wheel bracket 20 through the wheel axis bearing 22-4.

In FIG. 1, the rotational motion output from the motion synthesizer 23 through the vertical output shaft 10 drives pinion bever gear 79 for differential 24 to rotate the ring gear 80 around the wheel axis 13. At least one spider gear 26-1 and 26-2 is installed on the spider gear carrier 29 fixed to the ring gear 80, and at least one spider gear 26-1 and 26-2 is engaged with the first bevel gear 27-1 and the second bevel gear 27-2 coupled to the left and right wheel axis 13. The differential 24 can be attached to the wheel bracket 20 to accept rotational motion of the vertical output shaft 10 of the motion synthesizer 23 as input and produce two output rotational motion for driving the wheel. In some cases, the differential 24 can be attached to the wheel bracket 20 such that it accepts rotational motion of one of the horizontal output shafts 28-1 and 28-2 of the motion synthesizer 23 as input and produces two output rotational motion for driving the wheel.

The differential 24 is attached to the wheel bracket 20, accepts rotational motion of the vertical output shaft 10 of the motion synthesizer 23 as the input to produce two output rotational motions for driving the wheel 14-1 and 14-2. FIG. 1 shows an embodiment in which the differential 24 comprises the first spider gear 26-1 and the second spider gear 26-2. The spider gears 26-1 and 26-2 rotate around the wheel axis 13 together with the ring gear 80 to which the spider gear carrier 29 is fixed. At the same time, the spider gears 26-1 and 26-2 rotate relative to the spider gear carrier 29 when the rotation speeds of the left wheel 14-1 and the right wheel 14-2 are different.

In addition, in the present invention, the differential 24 uses a bevel gear as a representative example, but it can be modified and used as a variety of differential gear devices that ramifies one rotational motion input into two independent rotational motion outputs. (ex. Method using spur gears, method using epicyclic gear structure, Torsen method, etc.)

Figure 3:
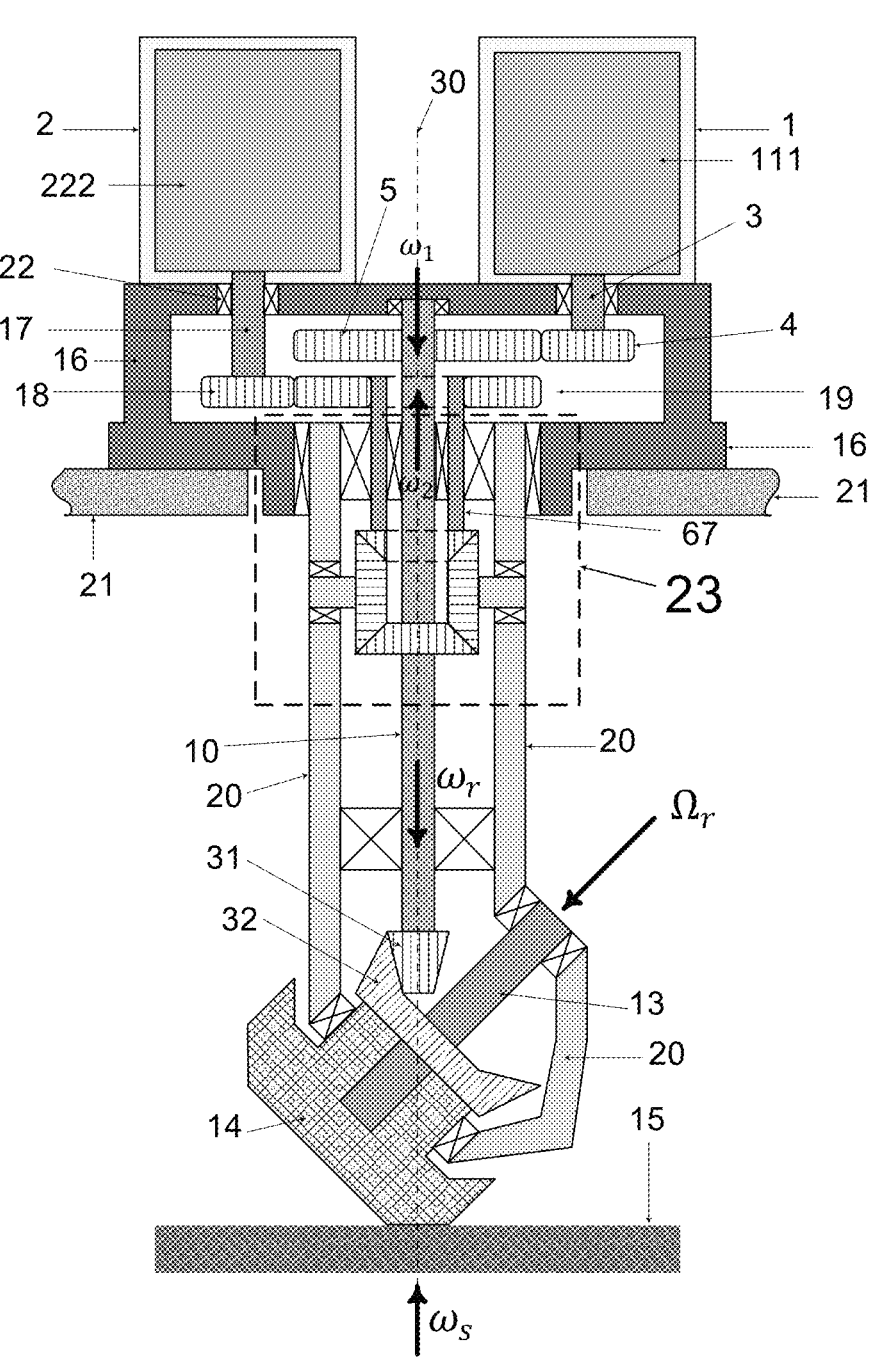
FIG. 3 presents a conceptual embodiment of current invention, demonstrating the transmission of the rotational motion from the vertical output shaft to the wheel.

FIG. 3 presents a conceptual embodiment of current invention, demonstrating the transmission of the rotational motion from the vertical output shaft to the wheel.

FIG. 3 shows an embodiment in which rotational motion is transmitted to the ring bevel gear 32 through the pinion bevel gear 31 installed on the vertical output shaft 10 shown in FIG. 1 to generate rolling motion in the wheel shaft 13 and wheel 14. This is achieved through internal gear meshing between the pinion bevel gear 31 and ring bevel gear 32, resulting in the rotation of wheel rotation Q, about a skewed axis. That is, the steer drive wheel mechanism comprises a power train unit that transmits the rotational motion of the vertical output shaft 10 of the motion synthesizer 23 to a skewed wheel axis 13.

Figure 4:
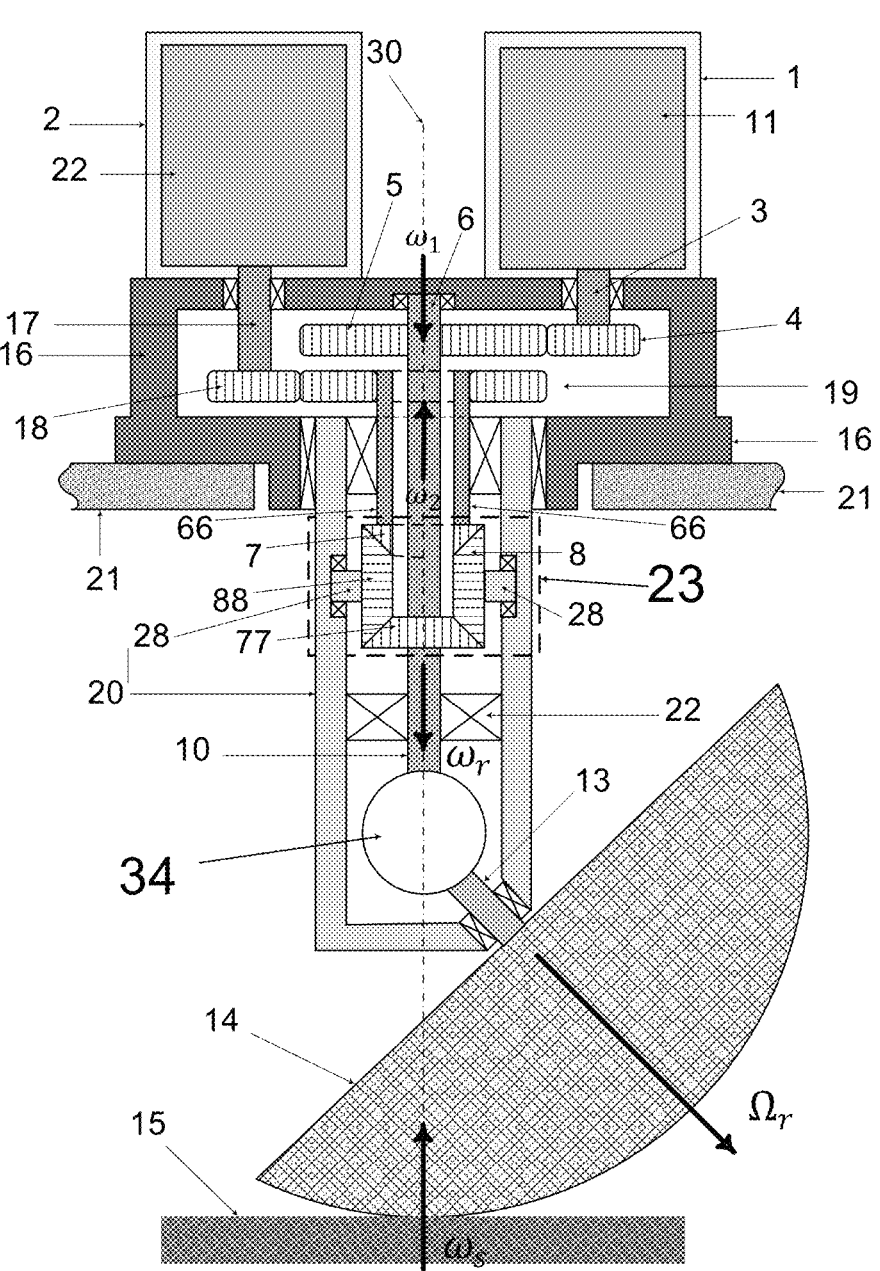
FIG. 4 presents another conceptual embodiment of current invention, demonstrating the transmission of the rotational motion from the vertical output shaft to the wheel.

FIG. 4 illustrates comparable concept of generating wheel rotation about a skewed axis, wherein the rotational motion of vertical output shaft 10 is conveyed to wheel shaft 13 through either constant velocity joint or bevel gear meshing 34.

Figure 5:
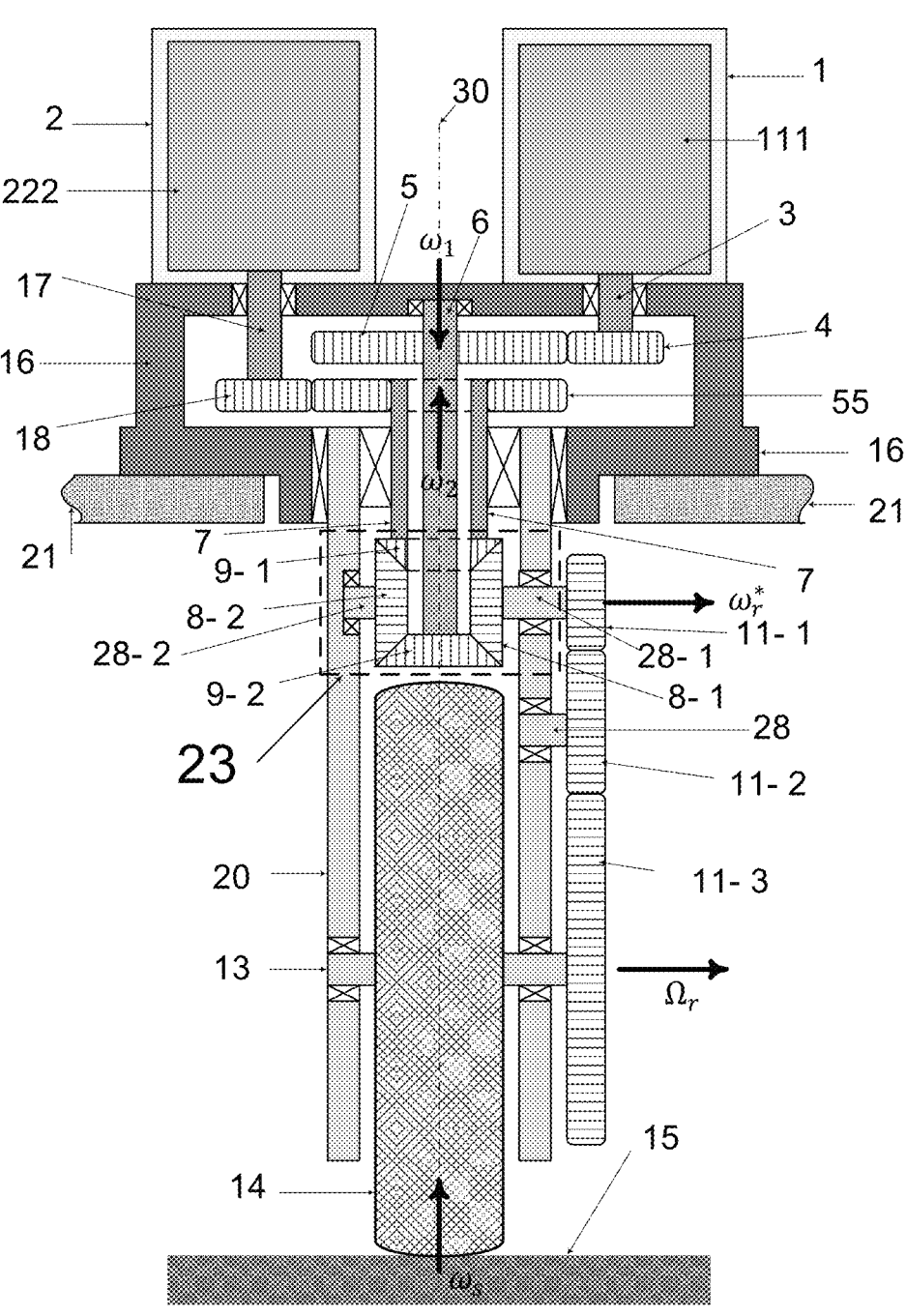
FIG. 5 showcases a conceptual embodiment of the current invention, utilizing the output rotational motion of the horizontal output shaft of motion synthesizer to induce the rotation of the wheel.

Moving on to FIG. 5, a conceptual embodiment of the current invention is showcased, utilizing the output rotational motion $$\omega_r^*$$

of the horizontal output shaft 28-1 of motion synthesizer 23 to induce the rotation of the wheel 14 about wheel axis 13. This is accomplished through a series of gear meshing among gears 11-1, 11-2, and 11-3. It is essential to note that the transmission of power between output shaft 28-1 and wheel axis 13 can be achieved through various other means, such as a timing belt or bevel gear meshing. Additionally, the output rotational motion $$\omega_r^*$$

of the horizontal output shaft 28-2, instead of the horizontal output shaft 28-1, of motion synthesizer 23 can serve the same purpose. That is, the steer drive wheel mechanism comprises a power train that transmit the rotational motion of the horizontal output shaft 28-1 of the motion synthesizer 23 to the wheel axis 13.

Figure 6:
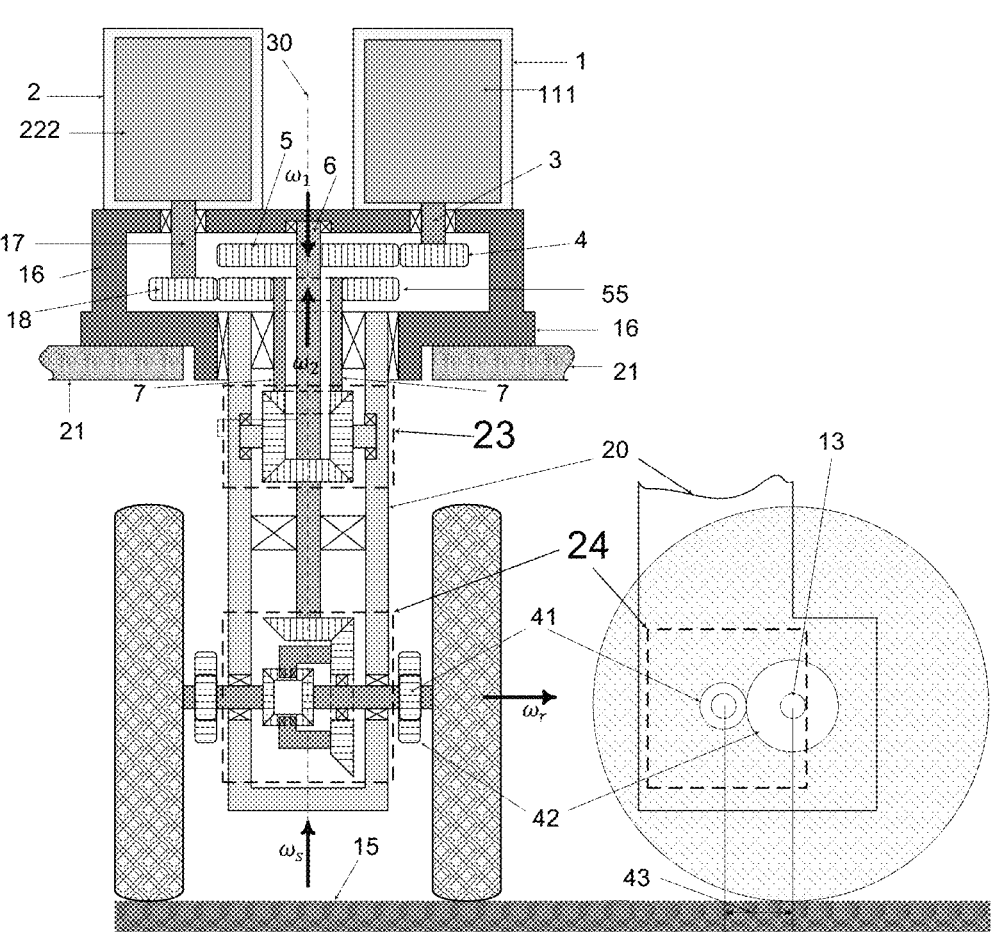
FIG. 6 depicts a conceptual embodiment of the current invention, introducing an offset distance between the wheel axis and the output axis of the differential.

FIG. 6 depicts a conceptual embodiment of the current invention, introducing an offset distance 43 between the wheel axis 13 and the output axis of the differential 24. This offset allows the platform to achieve acceleration in any direction on the ground plane. Specially, the offset distance 43 can be set by using a method in which the gear 41 installed on the wheel axis 13 of the differential 24 engages the gear 42 installed on the wheel bracket 20 to drive the wheel 14.

Figure 7:
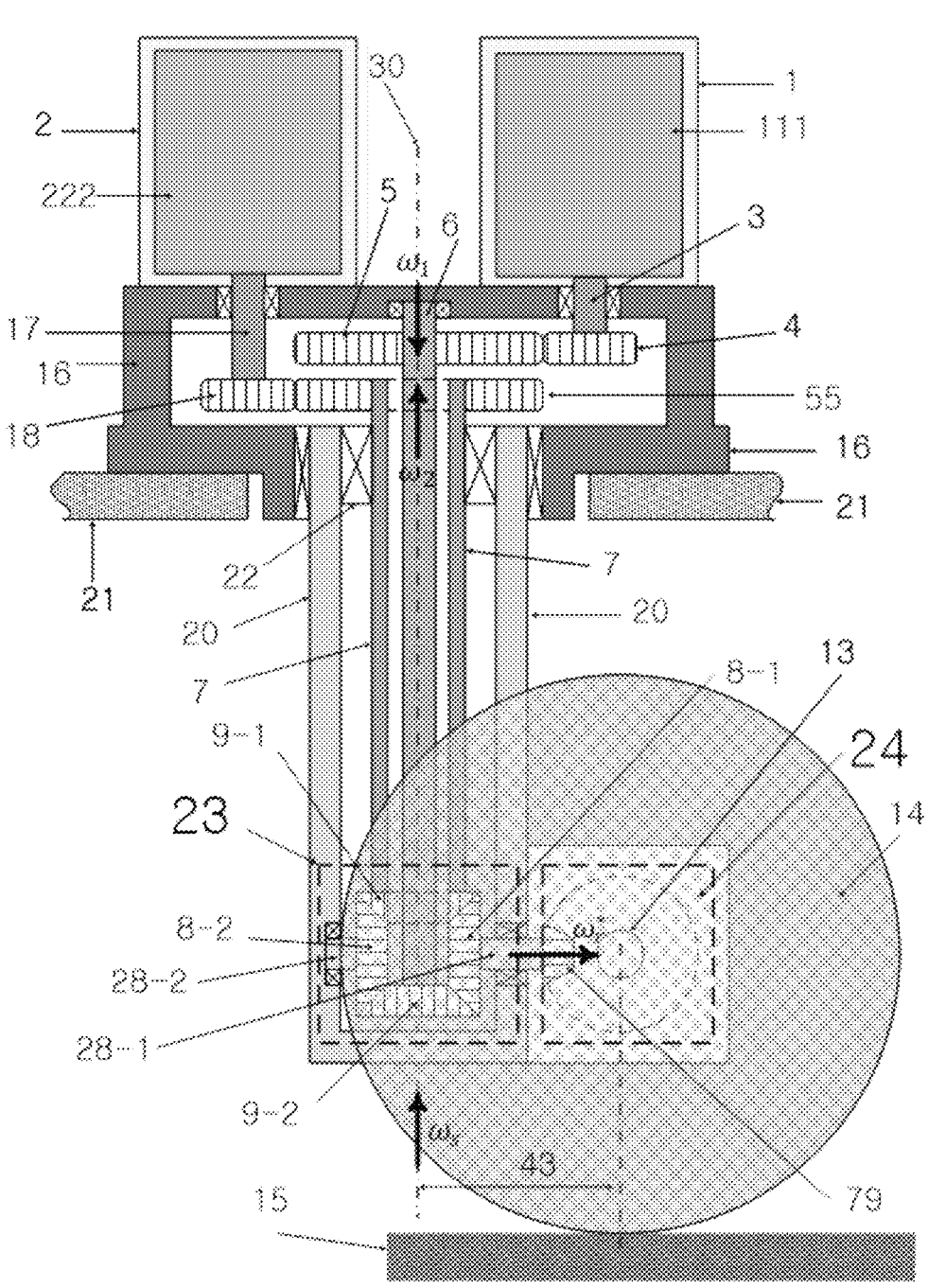
FIG. 7 shows a conceptual embodiment of the current invention, where the output rotational motion of the horizontal output shaft of motion synthesizer is directly fed into the differential.

In FIG. 7, a conceptual embodiment of the current invention is shown, where the output rotational motion $$\omega_r^*$$

of the horizontal output shaft 28-1 of motion synthesizer 23 is directly fed into the differential 24. This configuration naturally results in the introduction of an offset distance 43.

Figure 8:
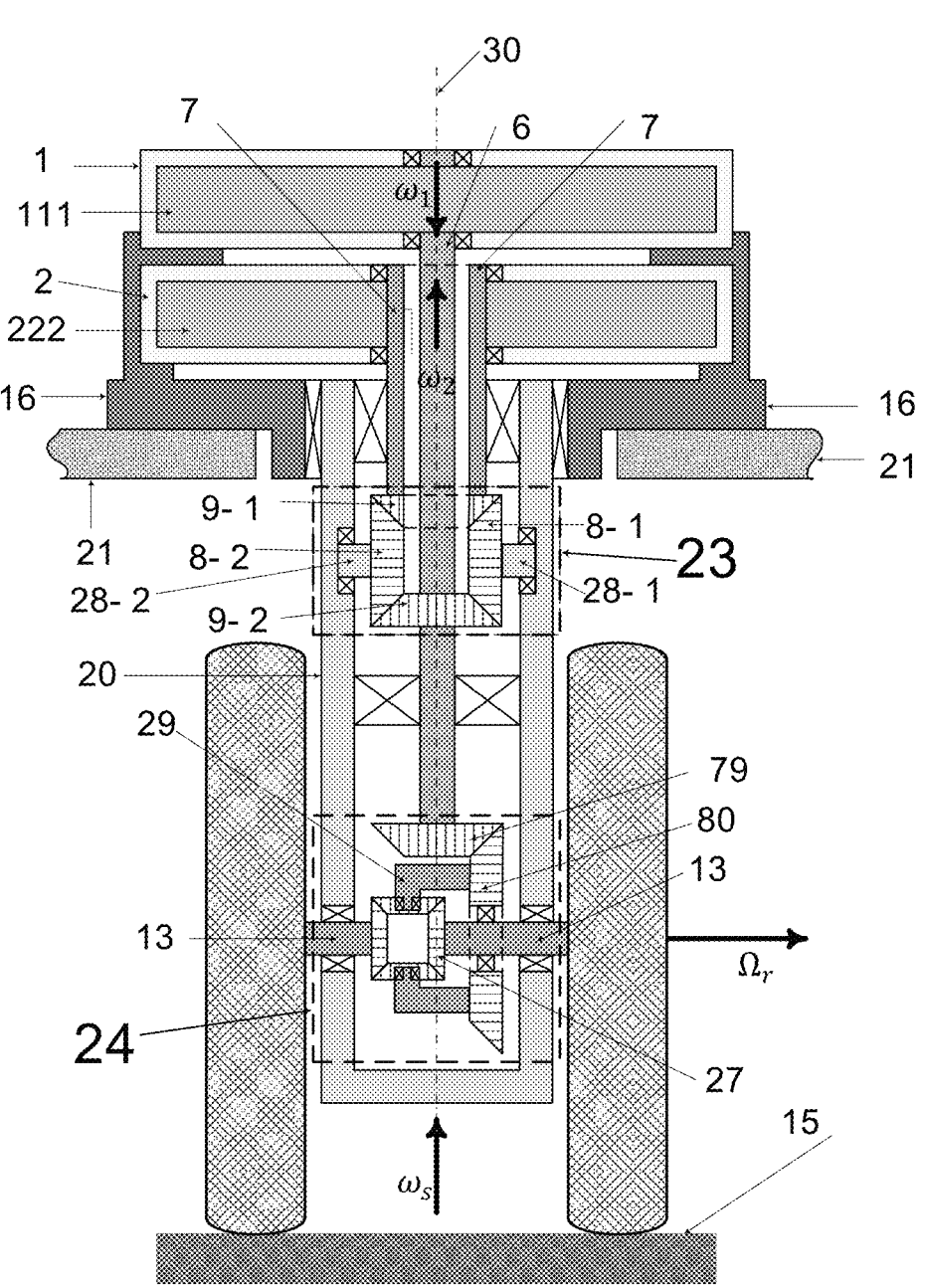
FIG. 8 illustrates a conceptual embodiment of the current invention, showcasing the arrangement of two stacked motors.

FIG. 8 illustrates a conceptual embodiment of the current invention, showcasing the arrangement of two stacked motors 1 and 2. This motor configuration, where the motor shafts are directly linked to the input shafts 6 and 7 of the motion synthesizer 23, proves particularly practical when high torque motors are feasible. This same motor arrangement can be implemented in any of the conceptual embodiments presented thus far.

Figure 9:
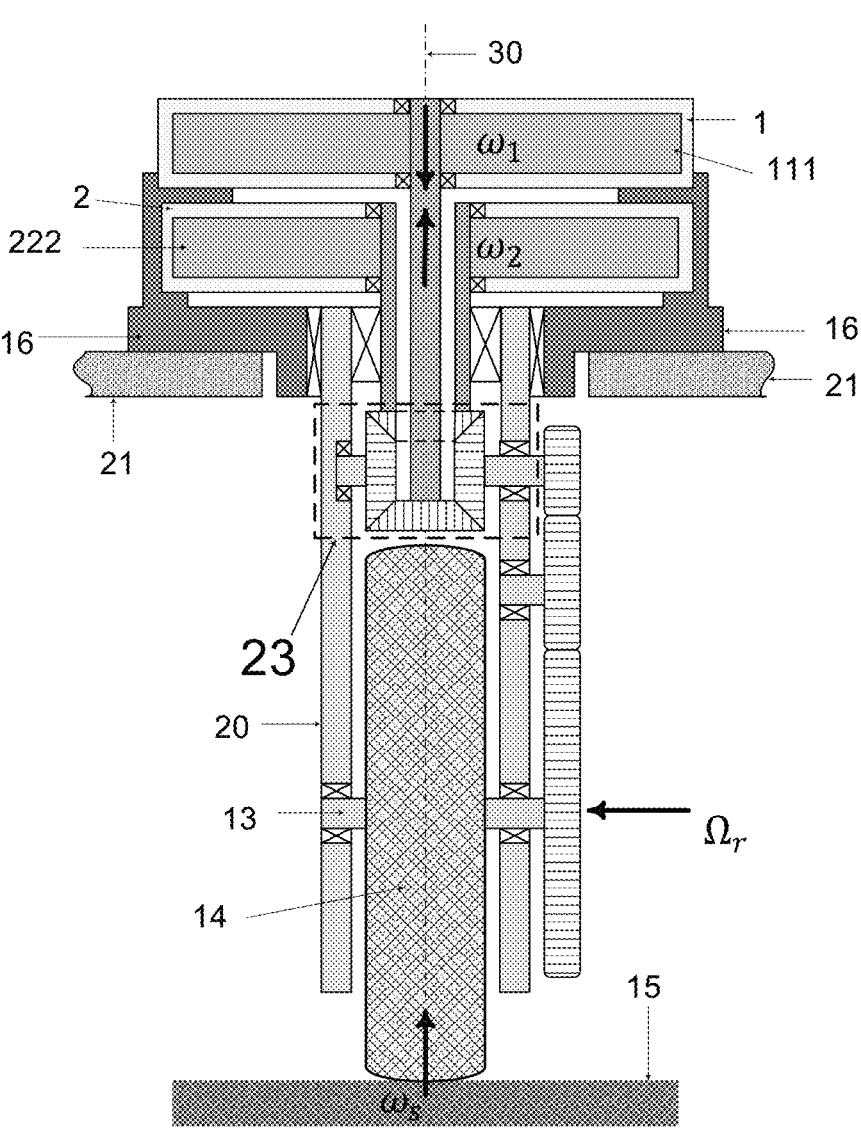
FIG. 9 demonstrates the outcome of altering the motor configuration depicted in FIG. 5.

As an illustration, FIG. 9 demonstrates the outcome of altering the motor configuration depicted in FIG. 5.

Figure 10:
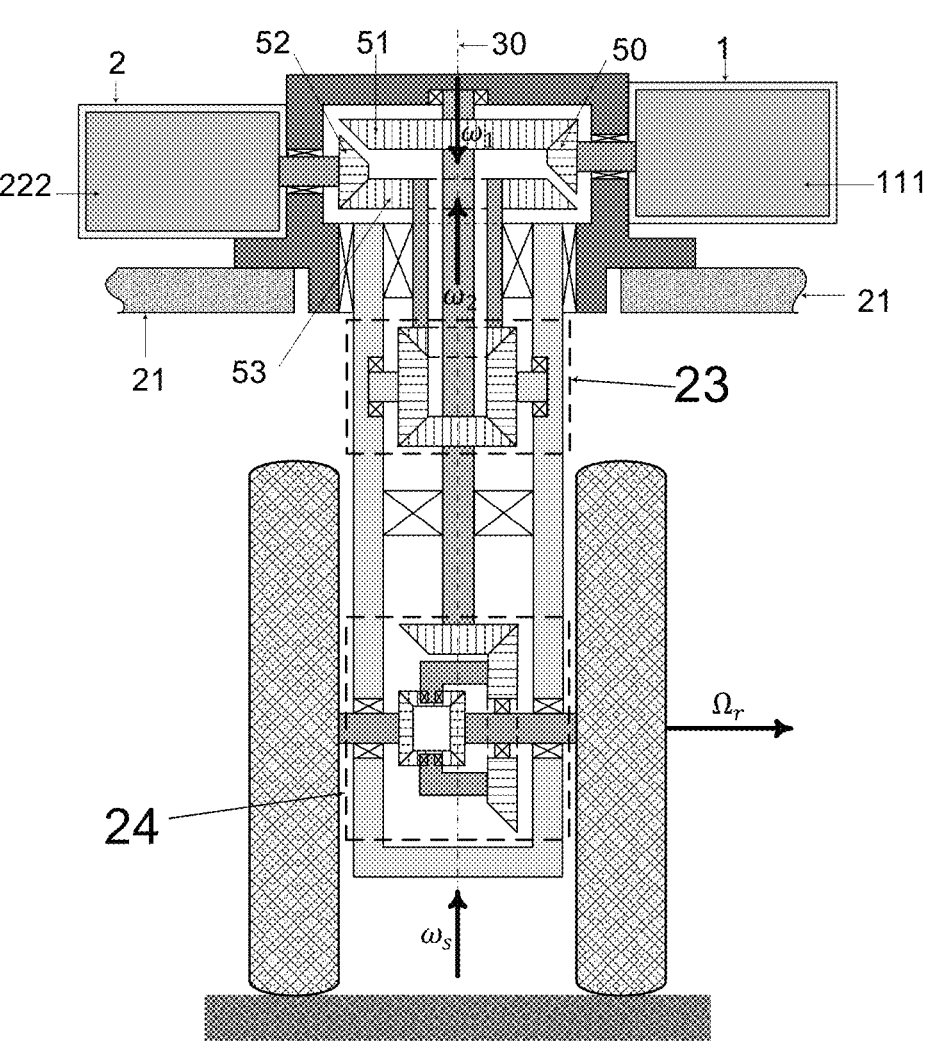
FIG. 10 shows an alternative motor installation variation, where two horizontally arranged motors deliver power to the motion synthesizer through bevel gear meshing.

In FIG. 10, an alternative motor installation variation is depicted, where two horizontally arranged motors deliver power to the motion synthesizer through bevel gear meshing. The motor shaft of the first motor 1 is positioned horizontally and connected to the pinion bevel gear 50 for the first motor 1. The pinion bevel gear 50 for the first motor 1 is engaged with the ring gear 51 attached to solid inner input shaft 6. Similarly, the motor shaft of the second motor 2 is positioned horizontally and connected to the pinion bevel gear 52 for the second motor 2. The pinion bevel gear 50 for the second motor 2 is engaged with the ring gear 53 attached to solid outer input shaft 7.

Figure 11:
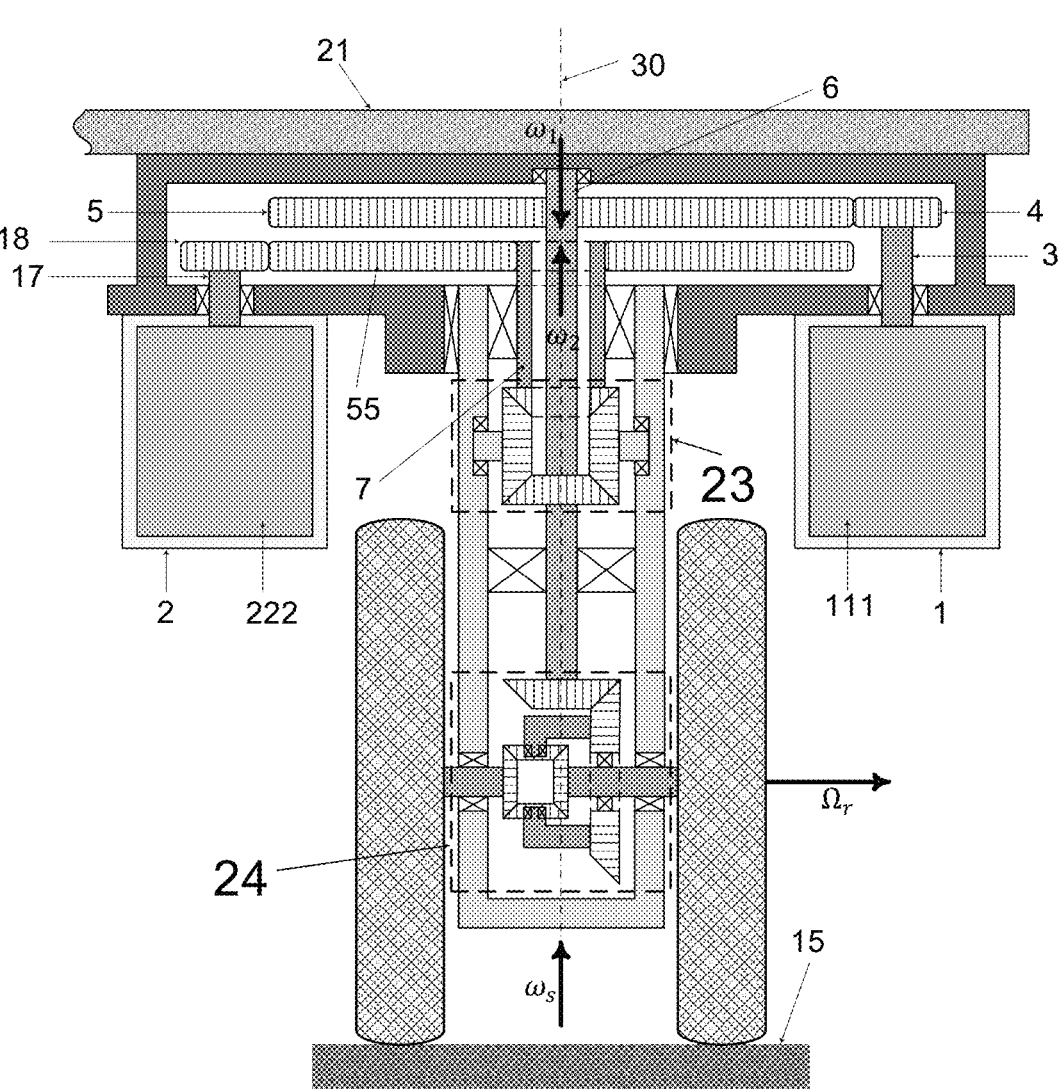
FIG. 11 illustrates a conceptual embodiment of the current invention reveals a configuration where two motors are positioned beneath the motor housing.

Moving to FIG. 11, a conceptual embodiment of the current invention reveals a configuration where two motors are positioned beneath the motor housing. FIG. 11 shows the motors 1 and 2 of the present invention are mounted beneath the fixed frame 16 to facilitate easy installation of the active caster wheel underneath the mobile platform 21.

Figure 12:
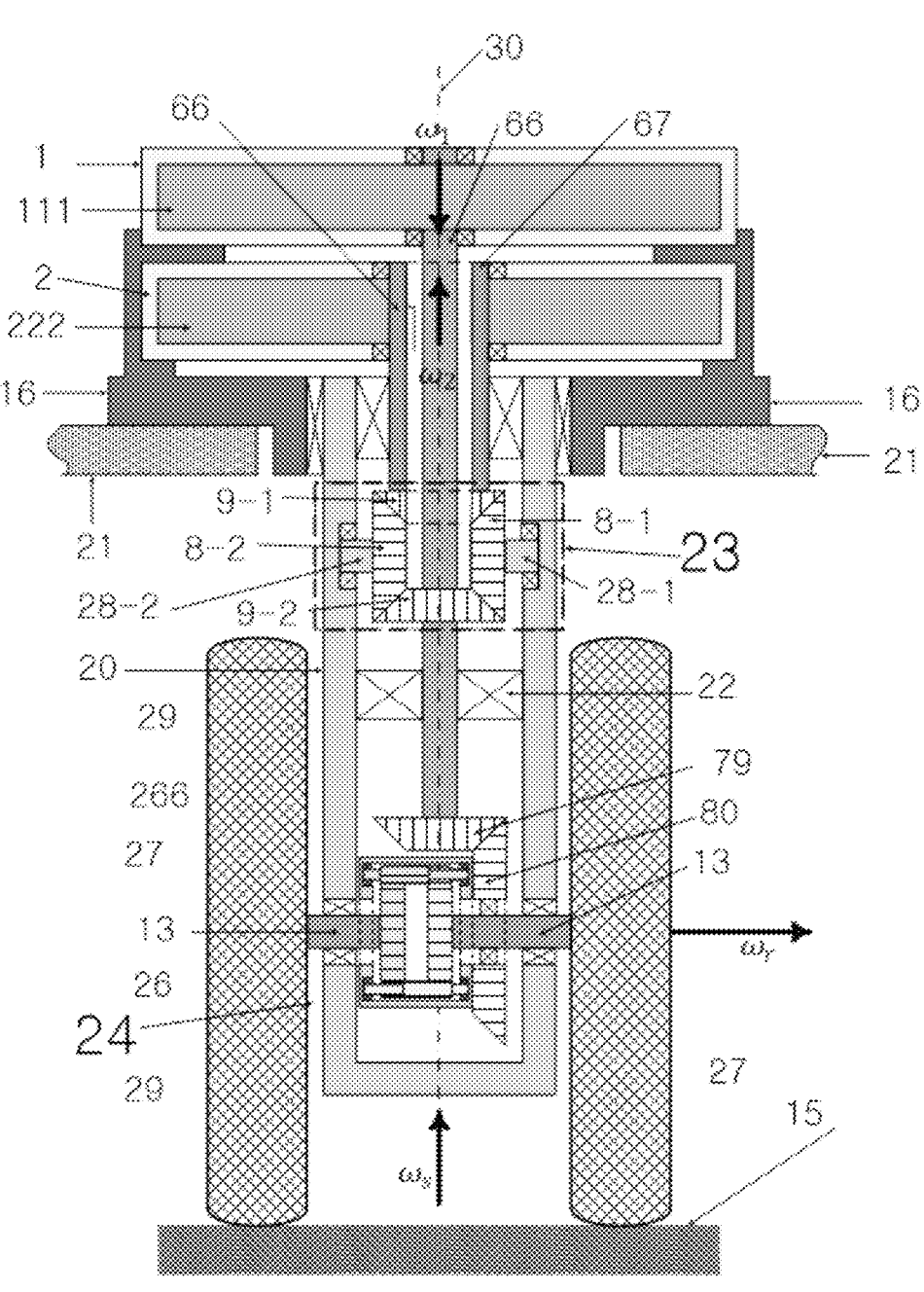
FIG. 12 presents a conceptual representation of the current invention, featuring a differential configuration using spur or helical gears instead of bevel gears.

It is essential to note that various potential variations in the arrangement of two motors exist, although not all are detailed in this document. For instance, two horizontally arranged motors could be configured to transfer power to the motion synthesizer 23 through worm gear and worm wheel meshing, providing a substantial gear ratio within limited space. Additionally, the option of replacing two motors with two groups of motors is also feasible In FIG. 12, a conceptual representation of the current invention is presented, featuring a differential 24 configuration using spur or helical gears instead of bevel gears. Alternative differentials, such as Torsen differential or epicyclic differential, can also be employed.

Figure 13:
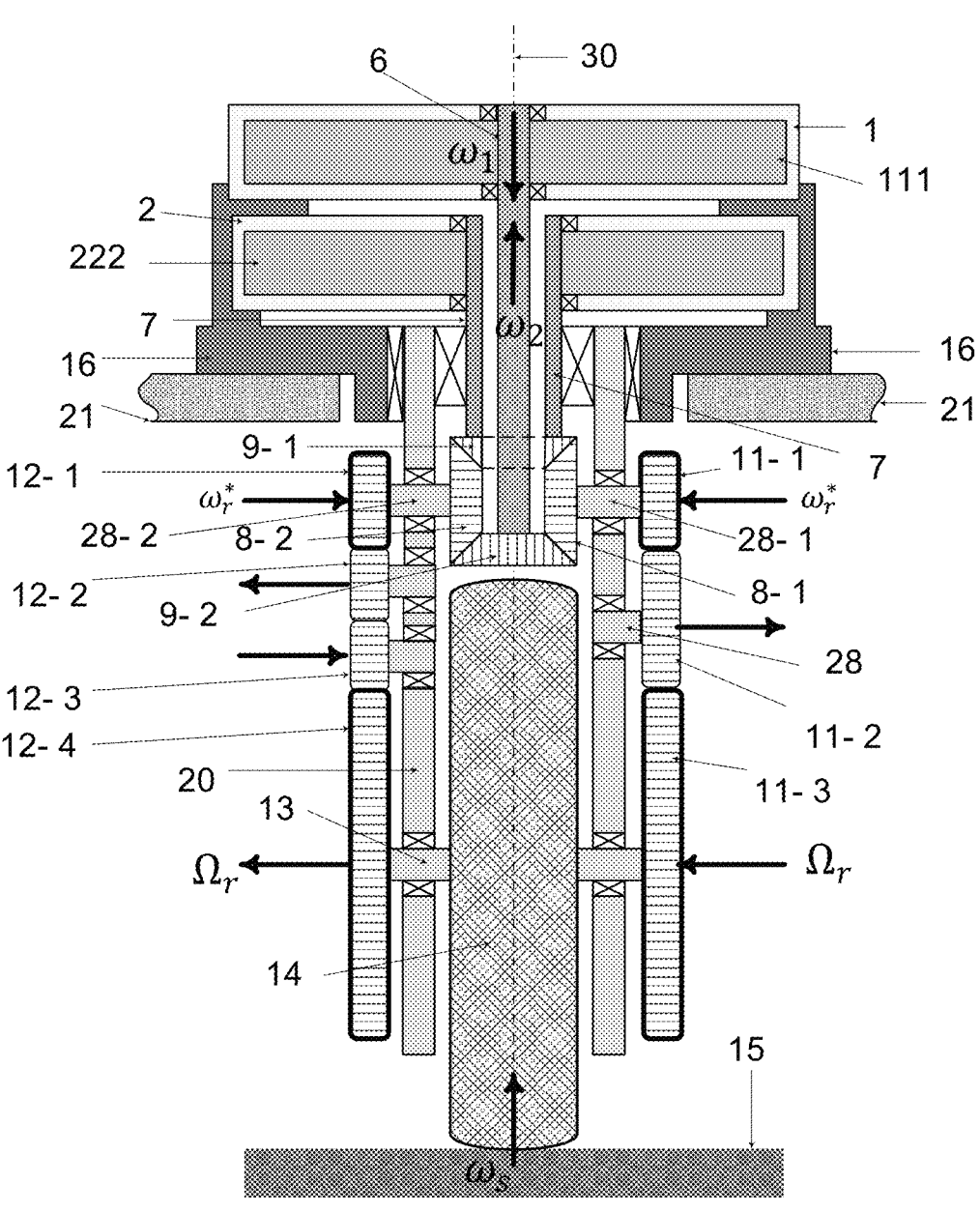
FIG. 13 shows a conceptual embodiment of the current invention, where the two rotational motions derived from both horizontal output shafts and of the motion synthesizer are used to propel the wheel.

FIG. 13 shows a conceptual embodiment of the current invention, where the two rotational motions derived from both horizontal output shafts 28-1 and 28-2 of the motion synthesizer are used to propel the wheel 14. It is noteworthy that angular speed of the horizontal output shafts 28-1 and 28-2 are equal in magnitude but opposite in direction. To ensure that both rotational motions of the two horizontal output shafts contribute in a synergetic way to the rotation of the wheel 14, two constraints must be imposed on the design of power train: Firstly, the gear ratio between gears 11-1 and 11-3 must be equal to the gear ratio between gears 12-1 and 12-4. Secondly, the gear train between gears 11-1 and 11-3 must be configured differently from the gear train between gears 12-1 and 12-4 such that both gear trains create an identical angular speed of the wheel, both in magnitude and in direction. FIG. 13 illustrates, among many possibilities, one potential configuration of these gear trains, wherein only one gear 11-2 is inserted between gears 11-1 and 11-3, while two gears 12-2 and 12-3 are inserted between gears 12-1 and 12-4. Note that timing belt or chain can be used instead of gears.

In this case, the gear unit of the motion synthesizer 23 comprises the first horizontal bevel gear 9-2, the second horizontal bevel gear 9-1, the first vertical bevel gear 8-1, the second vertical bevel gear 8-2, a first drive train unit, and a second drive train unit.

The first vertical bevel gear 8-1 is engaged with both the first horizontal bevel gear 9-2 and the second horizontal bevel gear 9-1 and coupled to a first horizontal output shaft 28-1. The second vertical bevel gear 8-2 is engaged with both the first horizontal bevel gear 9-2 and the second horizontal bevel gear 9-1 and coupled to a second horizontal output shaft 28-2.

The first drive train unit transmits the rotational motion of the first vertical bevel gear 8-1 to the wheel axis 13. The first drive train unit comprises gears 11-1 and 11-3. The first drive train unit can comprise additionally gear 11-2. The second drive train unit transmits the rotational motion of the second vertical bevel gear 8-2 to the wheel axis 13. The second drive train unit comprises gears 12-1 and 12-4. The second drive train unit can comprise gear 12-2 and 12-2 additionally. The difference between the number of gears constituting the first drive train unit and the number of gears constituting the second drive train unit is an odd number. Wherein the first and the second drive trains are configured to deliver the same rotational motion both in magnitude and direction to the wheel axis when the first vertical bevel gear and the second vertical bevel gear rotate with same angular speed but in opposite direction relative to the wheel bracket.

Figure 14:
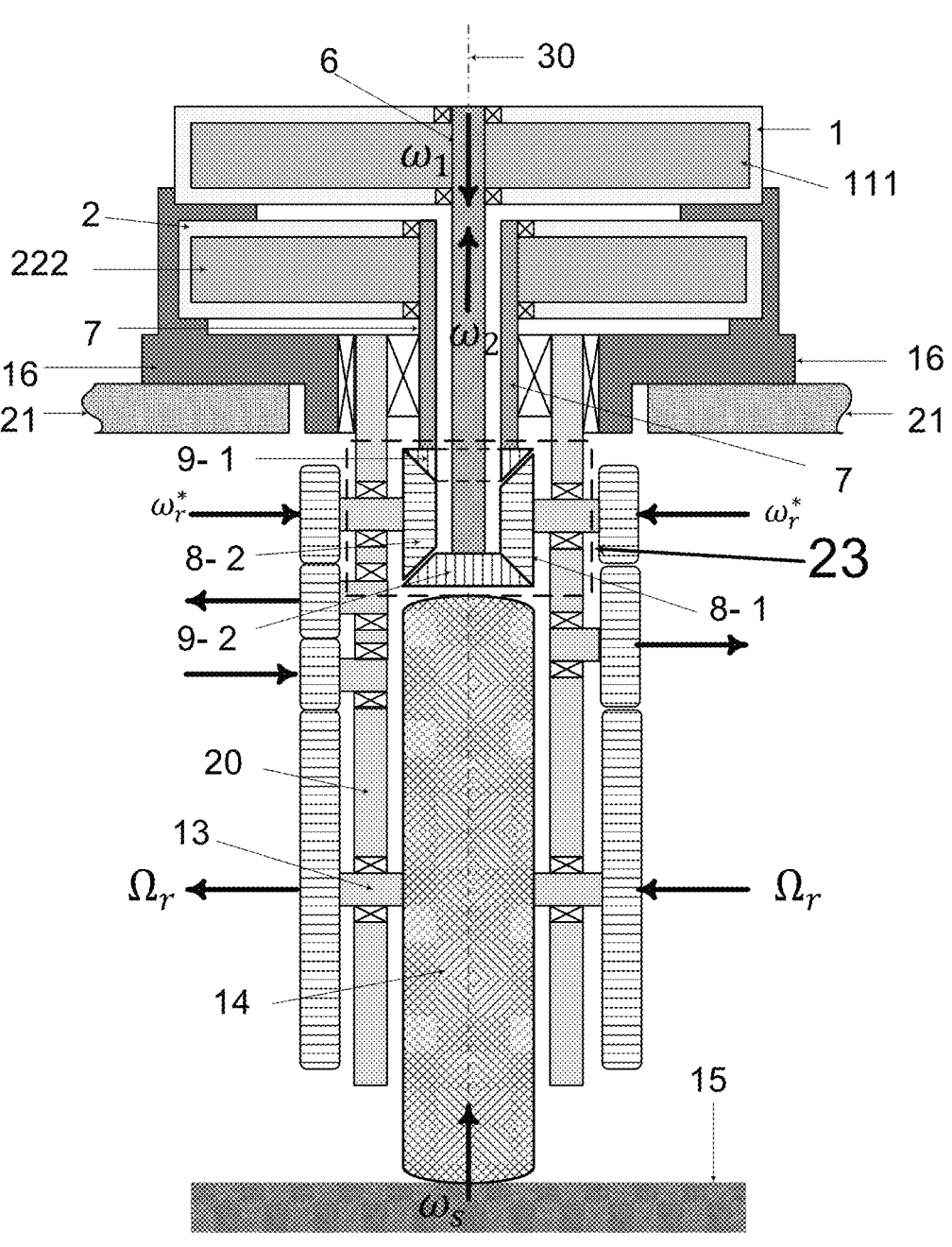
FIG. 14 illustrates a minor alteration to the motion synthesizer shown in FIG. 13, whose result brings about a significant shift in the operation of gear trains.

While FIG. 14 illustrates a minor alteration to the motion synthesizer shown in FIG. 13, the result brings about a significant shift in the operation of gear trains. The fundamental difference in this configuration of the motion synthesizer arises from how bevel gears are engaged inside the motion synthesizer 23. In this setup, the vertical bevel gear 8-1 engages only with horizontal bevel gear 9-2, while vertical bevel gear 8-2 engages only with the horizontal bevel gear 9-1. This arrangement establishes two distinct drive trains, both converging at the wheel axis 13, where they mutually interact. Consequently, unlike the configuration depicted in FIG. 13, there is no theoretical constraint on the arrangement of two drive trains between the inner and the outer shafts 6,7 and the wheel shaft 13, allowing for the design of two independent drive trains with complete freedom. FIG. 14, however, discloses one of myriad examples of configuring these two drive trains, ensuring they satisfy the same constraints as the configuration shown in FIG. 13. This specific configuration is practical, assuming the use of two identical motors to maintain symmetric collaboration. It is crucial to note that Eqns. (1-2), (1-3), (3-1), and (3-2) remain valid for this configuration.

In this case, the gear unit of the motion synthesizer 23 comprises the first horizontal bevel gear 9-2, the second horizontal bevel gear 9-1, the first vertical bevel gear 8-1, the second vertical bevel gear 8-2, a first drive train unit, and a second drive train unit.

The first vertical bevel gear 8-1 is engaged with the first horizontal bevel gear 9-2 and coupled to a first horizontal output shaft 28-1. The second vertical bevel gear 8-2 engaged with the second horizontal bevel gear 9-1 and coupled to a second horizontal output shaft 28-2.

The first drive train unit transmits the rotational motion of the first vertical bevel gear 8-1 to the wheel axis 13. The first drive train unit comprises gears 11-1 and 11-3. The first drive train unit can comprise gear 11-2 more. The second drive train unit transmits the rotational motion of the second vertical bevel gear 8-2 to the wheel axis 13. The second drive train unit comprises gears 12-1 and 12-4. The second drive train unit can comprise gear 12-2 and 12-2 more. The difference between the number of gears constituting the first

Figure 15:
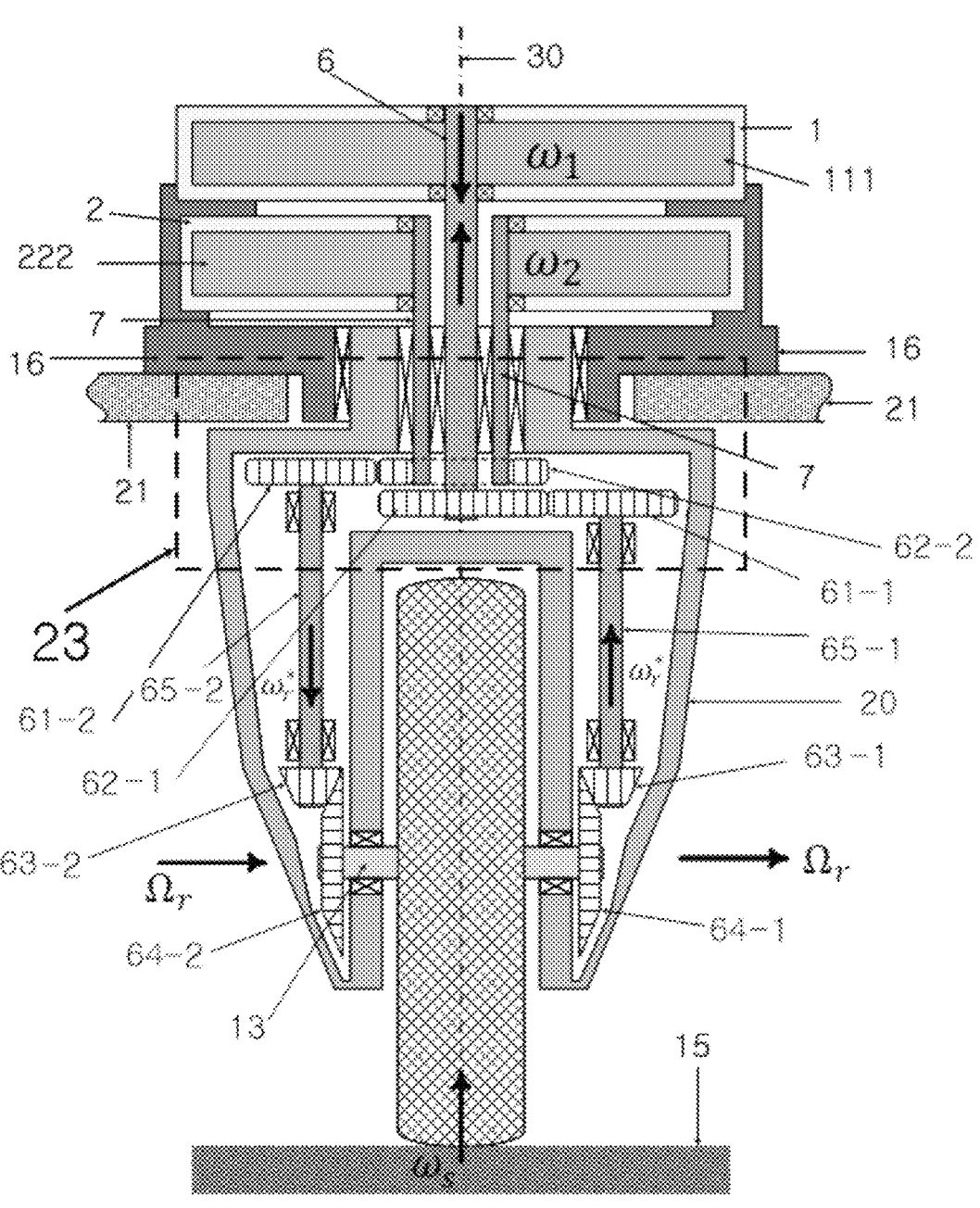
FIG. 15 shows a noteworthy alteration of the idea displayed in FIG. 14.

11 drive train unit and the number of gears constituting the second drive train unit is an odd number Maintaining the same idea of symmetric collaboration of two identical motors, FIG. 15 shows a noteworthy alteration of the idea displayed in FIG. 14, In this instance, spur or helical gears 61, 62 replace bevel gears within the motion synthesizer 23 and rotational motion of gear 61 is directly transmitted, through vertical shaft 65, to the bevel pinion gear 63 meshing with the bevel gear 64 coupled to the wheel axis 13, leading to a substantial simplification of the drive train. Equations (1-2), (1-3), (3-1), and (3-2) remain also valid for this configuration with a constant a determined by the gear ratio between gears 61 and 62.

A steer drive wheel mechanism for a mobile platform 21 comprises a fixed frame 16, wheel bracket 20, at least one wheel 14, a first motor 1 and a second motor 2, an inner input shaft 6 and an outer input shaft 7, and a motion synthesizer 23, and a gear unit.

Similarly, the fixed frame 16 remains stationary relative to the mobile platform 16. The wheel bracket 20 is rotatably mounted on the fixed frame 16 such that it can be steered about steer axis 30 relative to the fixed frame 16. At least one wheel 14 is rotatably mounted on the wheel bracket 20 through a wheel axis 13. The first motor 1 and the second motor 2 are rigidly installed on the fixed frame 16 to collaborate in driving and steering the wheel 14. The inner input shaft 6 and the outer input shaft 7 are configured coaxially along steer axis 30 to transmit two rotational motions generated by the first motor 1 and the second motor 2.

However, in this case, the motion synthesizer 23 can accept two rotational motions from the inner input shaft 6 and the outer input shaft 7 and produce two rotational motions of a first vertical shafts 65-1 and a second vertical shafts 65-2. The gear unit can be disposed within the motion synthesizer 23, the gear unit coupled to the inner input shaft 6, the outer input shaft 7, the first vertical shaft 65-1, and the second vertical shaft 65-2.

Moreover, the gear unit can comprise a first horizontal gear 62-1, a second horizontal gear 62-2, a third horizontal gear 61-1, a fourth horizontal gear 61-2. The first horizontal gear 62-1 is coupled to the inner input shaft 6 and configured to be rotated about the steer axis 30 by the inner input shaft 6. The second horizontal gear 62-2 is coupled to the outer input shaft 7 and configured to be rotated about the steer axis 30 by the outer shaft 7. The third horizontal gear 61-1 is coupled to the first vertical shaft 65-1 and engaged with the first horizontal gear 62-1. The fourth horizontal gear 61-2 is coupled to the second vertical shaft 65-2 and engaged with the second horizontal gear 62-2.

The steer drive wheel mechanism further comprises a first gearset to transmit the rotational motion of the first vertical shaft 65-1 to the horizontal wheel axis 13, and a second gearset unit to transmit the rotational motion of the second vertical shaft 65-2 to the horizontal wheel axis 13. The first gear set comprises pinion gear 63-1 and ring gear 64-1 and the second gear set comprises pinion gear 63-2 and ring gear 64-2. Both gear sets are configured to rotate relative to the wheel bracket 20.

The steer drive wheel mechanism further comprises a first gearset configured to transfer rotational motion of the first motor 1 to the inner input shaft 6, and a second gearset configured to transfer rotational motion of the second motor 2 to the outer input shaft 7. Both gear sets are configured to rotate relative to the fixed frame 16.

The preceding descriptions and illustrations are provided solely for demonstrative purposes and do not encompass all potential alternative embodiments of the invention. It is important to recognize that the present invention is not restricted to the specific embodiments described above and depicted herein, but rather includes all variations that fall within the scope of the appended claims.

What is claimed is:

1. A steer drive wheel mechanism for a mobile platform, where driving and steering of the wheel are controlled by two motors comprising:
   a fixed frame that remains stationary relative to the mobile platform;
   wheel bracket that is rotatably mounted on the fixed frame such that it can be steered about steer axis relative to the fixed frame;
   at least one wheel that is rotatably mounted on the wheel bracket through a wheel axis;
   a first motor and a second motor rigidly installed on the fixed frame to collaborate in driving and steering the wheel;
   an inner input shaft and an outer input shaft configured coaxially along steer axis to transmit two rotational motions generated by the first and the second motors, respectively;
   a motion synthesizer that accepts two rotational motions from the inner and the outer input shaft and produces rolling or driving motion of the wheel relative the wheel bracket and steering motion of the wheel bracket relative to the fixed frame;
   a vertical output shaft extended from inner input shaft and at least one horizontal output shaft; and
   a gear unit disposed within the motion synthesizer, the gear unit coupled to the inner input shaft, the outer input shaft, the horizontal output shaft.

2. The steer drive wheel mechanism according to claim 1, wherein the gear unit disposed within the motion synthesizer comprises:
   a first horizontal bevel gear coupled to the inner input shaft and configured to be rotated about the steer axis by the inner input shaft;
   a second horizontal bevel gear coupled to the outer input shaft and configured to be rotated about the steer axis by the outer input shaft; and
   at least one vertical bevel gear engaged with both the first and the second horizontal bevel gears and coupled to the horizontal output shaft.

3. The steer drive wheel mechanism according to claim 1, comprising a power train that transmit the rotational motion of the horizontal output shaft of the motion synthesizer to the wheel axis.

4. The steer drive wheel mechanism according to claim 1, comprising a power train unit that transmit the rotational motion of the vertical output shaft of the motion synthesizer to a skewed wheel axis.

5. The steer drive wheel mechanism according to claim 1, wherein a differential, attached to the wheel bracket, accepts rotational motion of the vertical output shaft of the motion synthesizer as an input to produce two output rotational motions for driving the wheel.

6. The steer drive wheel mechanism according to claim 1, wherein a differential attached to the wheel bracket accepts rotational motion of the horizontal output shaft of the motion synthesizer as an input to produce two output rotational motions for driving the wheel.

7. The steer drive wheel mechanism according to claim 1, wherein the gear unit comprises:

a first horizontal bevel gear coupled to the inner input shaft and configured to be rotated about the steer axis by the inner input shaft;

a second horizontal bevel gear coupled to the outer input shaft and configured to be rotated about the steer axis by the outer input shaft;

a first vertical bevel gear engaged with both the first horizontal bevel gear and the second horizontal bevel gear and coupled to a first horizontal output shaft;

a second vertical bevel gear engaged with both the first horizontal bevel gear and the second horizontal bevel gear and coupled to a second horizontal output shaft;

a first gear drive train unit to transmit the rotational motion of the first vertical bevel gear to the wheel axis;

a second drive train unit to transmit the rotational motion of the second vertical bevel gear to the wheel axis, and wherein the first and the second drive trains are configured to deliver the same rotational motion both in magnitude and direction to the wheel axis when the first vertical bevel gear and the second vertical bevel gear rotate with same angular speed but in opposite direction relative to the wheel bracket.

8. The steer drive wheel mechanism according to claim 1, wherein the gear unit comprises:

a first horizontal bevel gear coupled to the inner input shaft and configured to be rotated about the steer axis by the inner input shaft;

a second horizontal bevel gear coupled to the outer input shaft and configured to be rotated about the steer axis by the outer input shaft;

a first vertical bevel gear engaged with the first horizontal bevel gear and coupled to a horizontal output shaft;

a second vertical bevel gear engaged with the second horizontal bevel gear and coupled to a second horizontal output shaft;

a first drive train unit to transmit the rotational motion of the first vertical bevel gear to the wheel axis; and a second drive train unit to transmit the rotational motion of the second vertical bevel gear to the wheel axis.

9. The steer drive wheel mechanism according to claim 1, further comprising:

a first gear unit configured to transfer rotational motion of the first motor to the inner input shaft; and a second gear unit configured to transfer rotational motion of the second motor to the outer input shaft.

10. The steer drive wheel mechanism according to claim 1, wherein the first and the second motors are configured, based on the inner input shaft and the outer input shaft generating rotational motion in the same magnitude and direction to each other, to rotate the wheel bracket relative to the fixed frame about steer axis without causing rotational motion of the wheel about wheel axis relative to the wheel bracket, and wherein the first and the second motors are configured, based on the inner input shaft and the outer input shaft generating rotational motion in the same magnitude but opposite direction to each other, to rotate the wheel about the wheel axis relative to the wheel bracket without causing rotational motion of the wheel bracket about the steer axis relative to the fixed frame.

11. The steer drive wheel mechanism according to claim 1, wherein a differential attached to the wheel bracket accepts rotational motion of the vertical output shaft of the motion synthesizer as input and produces two output rotational motion for driving the wheel.

12. The steer drive wheel mechanism according to claim 1, wherein a differential attached to the wheel bracket accepts rotational motion of the horizontal output shaft of the motion synthesizer as input and produces two output rotational motion for driving the wheel.

13. A steer drive wheel mechanism for a mobile platform, where driving and steering of the wheel are controlled by two motors comprising:

a fixed frame that remains stationary relative to the mobile platform;

wheel bracket that is rotatably mounted on the fixed frame such that it can be steered about steer axis relative to the fixed frame;

at least one wheel that is rotatably mounted on the wheel bracket through a horizontal wheel axis;

a first motor and a second motor rigidly installed on the fixed frame to collaborate in driving and steering the wheel;

an inner input shaft and an outer input shaft configured coaxially along steer axis to transmit two rotational motions generated by the first and the second motors, respectively;

a motion synthesizer that accepts two rotational motions from the inner and the outer input shaft and produces two rotational motions of a first and a second vertical shafts; and a gear unit disposed within the motion synthesizer, the gear unit coupled to the inner input shaft, the outer input shaft, the first and the second vertical shafts.

14. The steer drive wheel mechanism according to claim 13, wherein the gear unit disposed within the motion synthesizer comprises:

a first horizontal gear coupled to the inner input shaft and configured to be rotated about the steer axis by the inner input shaft;

a second horizontal gear coupled to the outer input shaft and configured to be rotated about the steer axis by the outer input shaft;

a third horizontal gear coupled to the first vertical shaft and engaged with the first horizontal gear; and a fourth horizontal gear coupled to the second vertical shaft and engaged with the second horizontal gear.

15. The steer drive wheel mechanism according to claim 13, further comprising:

a first gearset to transmit the rotational motion of the first vertical shaft to the horizontal the wheel axis; and a second gearset unit to transmit the rotational motion of the second vertical shaft to the horizontal wheel axis.

16. The steer drive wheel mechanism according to claim 13, further comprising:

a first gearset configured to transfer rotational motion of the first motor to the inner input shaft; and a second gearset configured to transfer rotational motion of the second motor to the outer input shaft.

* * * * *